United States Patent
Weilbier

(10) Patent No.: US 10,707,677 B2
(45) Date of Patent: Jul. 7, 2020

(54) DIFFERENTIAL PROTECTION METHOD AND DIFFERENTIAL PROTECTION DEVICE FOR A TRANSFORMER

(71) Applicant: SIEMENS AKTIENGESELLSCHAFT, Munich (DE)

(72) Inventor: Joerg Weilbier, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 730 days.

(21) Appl. No.: 15/517,257

(22) PCT Filed: Oct. 10, 2014

(86) PCT No.: PCT/EP2014/071779
§ 371 (c)(1),
(2) Date: Apr. 6, 2017

(87) PCT Pub. No.: WO2016/055123
PCT Pub. Date: Apr. 14, 2016

(65) Prior Publication Data
US 2017/0331278 A1    Nov. 16, 2017

(51) Int. Cl.
*H02H 7/045* (2006.01)
(52) U.S. Cl.
CPC ................. *H02H 7/045* (2013.01)
(58) Field of Classification Search
CPC .............................. H02H 7/045; H02H 7/055
USPC ........ 307/14, 36; 361/35, 36, 44, 45, 63, 76, 361/87; 702/58, 59; 324/107
See application file for complete search history.

(56) References Cited

U.S. PATENT DOCUMENTS

| 6,507,184 B1* | 1/2003 | Elston | G01R 19/2513 |
| | | | 324/107 |
| 2009/0059447 A1* | 3/2009 | Gajic | H02H 7/045 |
| | | | 361/35 |
| 2015/0293166 A1* | 10/2015 | Mieske | H02H 3/283 |
| | | | 702/59 |

FOREIGN PATENT DOCUMENTS

| CN | 103746338 A | 4/2014 |
| DE | 10261837 A1 | 3/2004 |
| SU | 1272392 A1 | 11/1986 |

(Continued)

*Primary Examiner* — Rexford N Barnie
*Assistant Examiner* — Toan T Vu
(74) *Attorney, Agent, or Firm* — Laurence Greenberg; Werner Stemer; Ralph Locher

(57) ABSTRACT

A differential protection method allows monitoring a three-phase transformer. Current measured values are recorded for each phase on all sides of the transformer, a phase-related formation of difference values is carried out using the current measured values from a reference side and amplitude-adjusted and phase-angle-adjusted current measured values from all other sides. An internal error is detected if a difference value exceeds a threshold value. In order to form the amplitude-adjusted and phase-angle-adjusted current measured values, the current measured values recorded for all phases are initially subjected to an amplitude adjustment and then to a phase angle adjustment. In order to allow the phase angle shift to be freely adjusted, a defined matrix equation with a defined matrix coefficient is used for the phase angle adjustment of the current measured values from the particular other side of the transformer. There is also described a differential protection device.

13 Claims, 1 Drawing Sheet

(56) References Cited

FOREIGN PATENT DOCUMENTS

SU 1677762 A1 9/1991
WO 2007057240 A1 5/2007

* cited by examiner

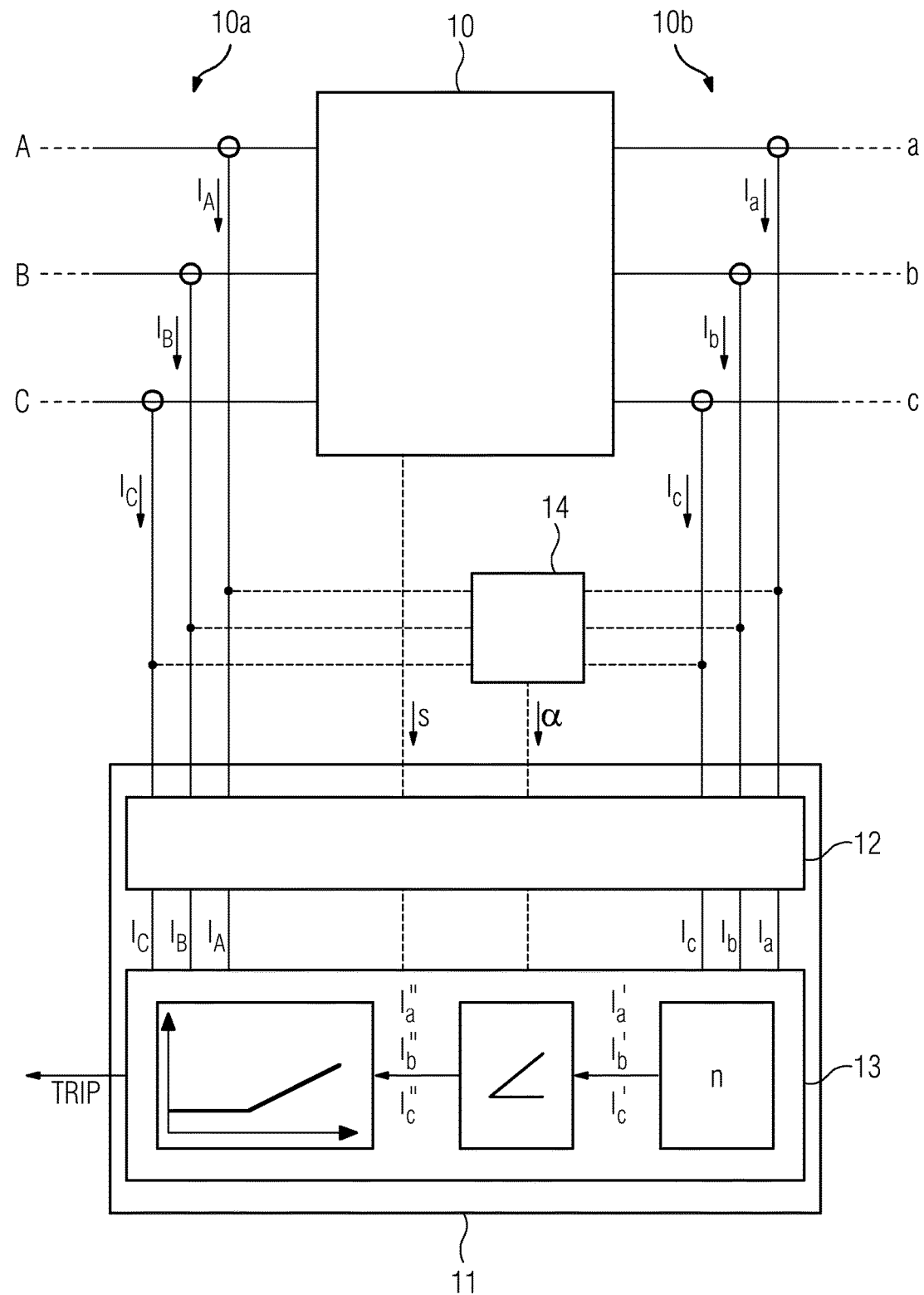

DIFFERENTIAL PROTECTION METHOD AND DIFFERENTIAL PROTECTION DEVICE FOR A TRANSFORMER

BACKGROUND OF THE INVENTION

Field of the Invention

The invention relates to a differential protection method for monitoring a three-phase transformer for internal faults, in which measured current values defining the current curve within the respective phase are registered for each phase on all sides of the transformer, a phase-related difference-value formation is carried out using the registered measured current values from a reference side of the transformer on the one hand and amplitude-adjusted and phase-angle-adjusted measured current values from all other sides of the transformer on the other hand while forming respective difference values, and an internal fault is detected in the transformer if at least one of the difference values exceeds a prespecified threshold value, wherein, in order to form the amplitude-adjusted and phase-angle-adjusted measured current values, the measured current values for all phases registered on all other sides of the transformer are initially subjected to an amplitude adjustment with the formation of amplitude-adjusted measured current values using the transformer ratio, after which the amplitude-adjusted measured current values are subjected to a phase-angle adjustment with the formation of amplitude-adjusted and phase-angle-adjusted measured current values, which compensates for a phase shift caused by the transformer.

The use of a so-called differential protection method is known for the protection of three-phase transformers in electrical energy supply systems. This involves measured current values that are registered on all sides of the transformer being compared with one another phase-by-phase by means of a differential protection device; an internal fault is detected if the difference in the measured current values on all sides of the transformer exceeds a prespecified threshold value for at least one phase.

Since a transformer itself causes a change in the amplitude and the phase angle, the measured current values of at least one side must be adjusted in respect of their amplitude and their phase angle before forming the difference value, in order to obtain measured current values that can be compared with one another for both sides of the transformer. For the amplitude, this adjustment is done using the known transformer ratio of the transformer. The amplitude adjustment is sufficiently well known to the expert, and will therefore not be explained in more detail at this point. For the phase angle, an adjustment also takes place making use of appropriate adjustment matrices. The respective adjustment matrix for conventional transformers is derived from the vector group of the transformer, and can, for example, be derived from suitable tables. Corresponding setting tables are usually available for phase angle shifts in 30° steps.

A differential protection method for a transformer with stepped prespecified adjustment matrices of this sort is, for example, known from the German patent publication DE 102 61 837 A1.

As a result, in particular, of the energy feed from renewable energy sources that are only available discontinuously, the application of so-called phase-shift transformers with any desired phase shift that can be adjusted during operation is increasing. Using the known adjustment matrices that can be set in steps, such transformers can be protected against faults only through a correspondingly insensitive setting of the threshold value for the differential protection. There is therefore a need for differential protection methods and differential protection devices with which the adjustment of the measured current value to the phase-angle shift that is actually present can be performed continuously. An example of a differential protection method with continuous phase-angle adjustment is known, for example, from U.S. Pat. No. 6,507,184 B1. In the known method, the adjustment is performed using an adjustment matrix with matrix components that are orthogonal to one another.

SUMMARY OF THE INVENTION

The invention addresses the object of providing an alternative method for phase-angle adjustment of the measured current values in a differential protection method and a differential protection device, which permits a free adjustment of the phase-angle shift and can be performed comparatively simply.

For the achievement of this object, a differential protection method of the type mentioned above is configured in such a way that the following equation is used for phase-angle adjustment of the measured current values of the respective other side of the transformer:

$$\begin{pmatrix} I''_a \\ I''_b \\ I''_c \end{pmatrix} = \begin{pmatrix} k(\alpha) & k(\alpha - 120°) & k(\alpha + 120°) \\ k(\alpha + 120°) & k(\alpha) & k(\alpha - 120°) \\ k(\alpha - 120°) & k(\alpha + 120°) & k(\alpha) \end{pmatrix} \cdot \begin{pmatrix} I'_a \\ I'_b \\ I'_c \end{pmatrix},$$

with the matrix coefficients $$k(\alpha) = \frac{2}{3} \cdot \cos(\alpha) + \frac{1}{3} \cdot \sqrt{2} \cdot \cos\left(3 \cdot \alpha + \frac{1}{4} \cdot \pi\right),$$

where $I''_a$=amplitude-adjusted and phase-angle-adjusted measured current value of the respective other side of the transformer for phase a;

$I''_b$=amplitude-adjusted and phase-angle-adjusted measured current value of the respective other side of the transformer for phase b;

$I''_c$=amplitude-adjusted and phase-angle-adjusted measured current value of the respective other side of the transformer for phase c;

$I'_a$=amplitude-adjusted measured current value of the respective other side of the transformer for phase a;

$I'_b$=amplitude-adjusted measured current value of the respective other side of the transformer for phase b;

$I'_c$=amplitude-adjusted measured current value of the respective other side of the transformer for phase c;

α=shift in the phase angle caused by the transformer when under load between the phase-related currents on the respective other side of the transformer in respect of the phase-related currents on the reference side of the transformer.

The proposed adjustment matrix with the matrix coefficients k can advantageously be used for phase-angle adjustment of the measured current values at arbitrary phase angle α.

This phase-angle shift a applies when under load to the measured current values, and corresponds, when not under load (when effectively no currents flow through the transformer), to the phase-angle shift caused with respect to the voltages ("no-load voltage").

The differential protection comparison of the amplitude-adjusted and phase-angle-adjusted measured current values of the respective other side of the transformer and of the measured current values registered for the reference side of the transformer then takes place. Either a threshold value that has a fixed prespecification or a dynamic threshold value can be used here. For a dynamic threshold value comparison, it is possible, for example, in addition to the difference current values, also to determine so-called stabilization current values that give, for example, the sum of the measured current values—amplitude-adjusted and phase-angle-adjusted if necessary—and to evaluate the position of a pair of values consisting of a difference current value and an associated stabilization value in a tripping diagram. The threshold value can then be specified in the tripping diagram as one or a plurality of curve(s) that depend on the stabilization current.

The primary side of the transformer can, for example, be used as its reference side. The respective other sides of the transformer in this case are formed by one or a plurality of secondary sides. In the case of a transformer with two sides, the primary side can, for example, be the high-voltage side and the secondary side (the other side) the low-voltage side of the transformer. Other side-related specifications are, however, also possible within the context of the invention, provided it is ensured that through the adjustment of the measured current values, the changes in respect of amplitude and phase angle caused by the transformer itself are compensated for.

If on one side of the transformer, due to an associated neutral point treatment, a neutral current arises and can influence the differential protection measurement, it is possible in accordance with an advantageous form of embodiment of the differential protection method according to the invention to provide that in the phase-angle adjustment, a correction of a neutral current component of the amplitude-adjusted measured current values of the respective other side of the transformer also takes place, wherein, in this case, the phase-angle adjustment is performed according to the following extended equation:

$$\begin{pmatrix} I''_a \\ I''_b \\ I''_c \end{pmatrix} = \begin{pmatrix} k(\alpha) & k(\alpha-120°) & k(\alpha+120°) \\ k(\alpha+120°) & k(\alpha) & k(\alpha-120°) \\ k(\alpha-120°) & k(\alpha+120°) & k(\alpha) \end{pmatrix} \cdot \begin{pmatrix} I'_a \\ I'_b \\ I'_c \end{pmatrix} + f(\alpha) \cdot \begin{pmatrix} I'_e \\ I'_e \\ I'_e \end{pmatrix},$$

with the neutral current component factor $$f(\alpha) = \frac{1}{3} \cdot \sqrt{2} \cdot \cos\left(3 \cdot \alpha + \frac{1}{4} \cdot \pi\right),$$

where $I'_e$=amplitude-adjusted neutral-point current. When compared with phase-angle adjustment without a neutral current correction, here only the term that depends on the neutral-point current $$f(\alpha) \cdot \begin{pmatrix} I'_e \\ I'_e \\ I'_e \end{pmatrix}$$

is appended, with the neutral current component factor $f(\alpha)$, to the adjustment matrix.

According to an advantageous form of embodiment of the differential protection method according to the invention, it is provided in this context that the neutral-point current is determined by measurement and is subjected to an amplitude adjustment making use of the transformer ratio, forming an amplitude-adjusted neutral-point current.

This form of embodiment is suitable when the neutral-point current can be determined by a dedicated current transducer. If the neutral-point current does not appear on that side of the transformer for which the amplitude-adjustment and phase-angle adjustment of the measured current values is performed, the neutral-point current must be adjusted in advance in terms of its amplitude making use of the transformer ratio. One possible way of measuring the neutral-point current is known, for example, from DE4416048C1.

As an alternative to this form of embodiment it is also possible, according to another advantageous form of embodiment of the differential protection method according to the invention, to provide that the neutral-point current is calculated from the amplitude-adjusted measured current values of the one side of the transformer.

This calculation can take place using the amplitude-adjusted measured current values as follows, and is known to the expert as "neutral current elimination":

$$I'_e = -(I'_a + I'_b + I'_c).$$

An advantageous form of embodiment of the method according to the invention furthermore provides that the shift in the phase angle caused by the transformer when under load between the phase-related currents on the respective other side of the transformer in respect of the phase-related currents on the reference side of the transformer is prespecified as a parameter.

This form of embodiment is in particular suitable for transformers in which the phase-angle shift is rigidly predetermined by the construction. Through the use of the adjustment equation described above, the phase-angle adjustment can here take place at an arbitrary phase angle (not only in 30° steps). The parameter to be used for the setting of the phase-angle shift is usually quoted by the manufacturer of the transformer, and corresponds to the phase-angle shift caused when the transformer is not under load in respect of the voltages ("no-load voltage").

An alternative advantageous form of embodiment provides that the shift in the phase angle caused by the transformer when under load between the phase-related currents on the respective other side of the transformer in respect of the phase-related currents on the reference side of the transformer is determined by measurement.

In this form of embodiment, the greatest possible flexibility and dynamicity of the setting of the adjustment matrix can be achieved in that the phase-angle shift actually present can be measured continuously or at specific time intervals, and used for control of the phase-angle adjustment.

The determination of the phase-angle shift by measurement can take place when the transformer is under load, for example using the positive sequence currents formed from the measured current values of a respective side. When the transformer is not under load, the phase-angle shift can be determined by measuring the voltages on all sides of the transformer, provided that suitable measuring equipment is present and that the differential protection device has appropriate measurement inputs.

According to an alternative form of embodiment of the differential protection method according to the invention it is furthermore provided that the shift in the phase angle caused by the transformer when under load between the phase-related currents on the respective other side of the transformer in respect of the phase-related currents on the reference side of the transformer is derived from the position of a tap switch of the transformer.

In this form of embodiment, the position of the transformer tap switch is registered and a corresponding phase-angle shift is derived from this. Corresponding tables or lists stored as a data record in a differential protection device that is performing the differential protection method can, for example, be used for this purpose. It is thus provided according to an advantageous development of this form of embodiment of the differential protection method according to the invention, that the phase-angle shift is determined using a table giving the respective position of the tap switch together with the phase-angle shift it causes. Such a table is usually stored in a data memory of a differential protection device carrying out the differential protection method in the course of a device configuration.

According to an alternative development, however, it can also be provided that the phase-angle shift is determined using a mathematical equation describing the respective phase-angle shift depending on the respective position of the tap switch. The configuration of such an equation depends, for example, on the magnetic and electrical coupling of the inductances of the transformer. The coefficients of this equation are derived from winding count ratios. The tap switch setting is included as a variable or parameter.

In terms of the differential protection device, the object referred to above is achieved by a differential protection device for monitoring a three-phase transformer for internal faults, with a measured value registration device that is configured to register measured current values defining the current curve within the respective phase for each phase on all sides of the transformer, and with an evaluation device that is designed to carry out a phase-related difference-value formation using the registered measured current values from a reference side of the transformer on the one hand and amplitude-adjusted and phase-angle-adjusted measured current values from all other sides of the transformer on the other hand while forming respective difference values, and to detect an internal fault in the transformer if at least one of the difference values exceeds a prespecified threshold value. The evaluation device is here designed, in order to form the amplitude-adjusted and phase-angle-adjusted measured current values, to initially subject the measured current values for all phases registered on all other sides of the transformer to an amplitude adjustment with the formation of amplitude-adjusted measured current values using the transformer ratio, and then to subject the amplitude-adjusted measured current values to a phase-angle adjustment with the formation of amplitude-adjusted and phase-angle-adjusted measured current values, which compensates for a phase shift caused by the transformer.

It is provided according to the invention that the evaluation device is designed to use the following equation for phase-angle adjustment of the measured current values of the one side of the transformer:

$$\begin{pmatrix} I''_a \\ I''_b \\ I''_c \end{pmatrix} = \begin{pmatrix} k(\alpha) & k(\alpha - 120°) & k(\alpha + 120°) \\ k(\alpha + 120°) & k(\alpha) & k(\alpha - 120°) \\ k(\alpha - 120°) & k(\alpha + 120°) & k(\alpha) \end{pmatrix} \cdot \begin{pmatrix} I'_a \\ I'_b \\ I'_c \end{pmatrix},$$

with the matrix coefficients $$k(\alpha) = \frac{2}{3} \cdot \cos(\alpha) + \frac{1}{3} \cdot \sqrt{2} \cdot \cos\left(3 \cdot \alpha + \frac{1}{4} \cdot \pi\right),$$

where
$I''_a$=AMPLITUDE-ADJUSTED AND PHASE-ANGLE-ADJUSTED measured current value of the respective other side (10b) of the transformer (10) for phase a;
$I''_b$=amplitude-adjusted and phase-angle-adjusted measured current value of the respective other side (10b) of the transformer (10) for phase b;
$I''_c$=amplitude-adjusted and phase-angle-adjusted measured current value of the respective other side (10b) of the transformer (10) for phase c;
$I'_a$=amplitude-adjusted measured current value of the respective other side (10b) of the transformer (10) for phase a;
$I'_b$=amplitude-adjusted measured current value of the respective other side (10b) of the transformer (10) for phase b;
$I'_c$=amplitude-adjusted measured current value of the respective other side (10b) of the transformer (10) for phase c;
α=shift in the phase angle caused by the transformer when under load between the phase-related currents on the respective other side (10b) of the transformer (10) in respect of the phase-related currents on the reference side (10a) of the transformer (10).

According to a form of embodiment of the differential protection device according to the invention, it is provided for neutral current correction that in the phase-angle adjustment, a correction of a neutral current component of the amplitude-adjusted measured current values of the respective other side of the transformer also takes place, wherein, in this case, the phase-angle adjustment is performed according to the following extended equation:

$$\begin{pmatrix} I''_a \\ I''_b \\ I''_c \end{pmatrix} = \begin{pmatrix} k(\alpha) & k(\alpha - 120°) & k(\alpha + 120°) \\ k(\alpha + 120°) & k(\alpha) & k(\alpha - 120°) \\ k(\alpha - 120°) & k(\alpha + 120°) & k(\alpha) \end{pmatrix} \cdot \begin{pmatrix} I'_a \\ I'_b \\ I'_c \end{pmatrix} + f(\alpha) \cdot \begin{pmatrix} I'_e \\ I'_e \\ I'_e \end{pmatrix},$$

with the neutral current component factor $$f(\alpha) = \frac{1}{3} \cdot \sqrt{2} \cdot \cos\left(3 \cdot \alpha + \frac{1}{4} \cdot \pi\right),$$

where
$I'_e$=amplitude-adjusted neutral-point current.

A further advantageous form of embodiment of the device according to the invention furthermore provides that the measured value registration device of the differential protection device comprises means for registering the position of a tap switch of the transformer. The means for registering the position of the tap switch can, for example, comprise one or a plurality of binary inputs of the measured value registration device that are followed by an evaluation logic.

According to a further advantageous form of embodiment of the device according to the invention it can furthermore be provided that the measured value registration device or the evaluation device of the differential protection device comprises means for registering the shift in the phase angle caused by the transformer when under load between the phase-related currents on the respective other side of the transformer in respect of the phase-related currents on the reference side of the transformer. The means can, for example, comprise an appropriate logic for calculating the phase-angle shift from the measured current values that have been measured. Alternatively, the phase angle detection can, however, also be done by means of a separate device, so that the means for registering the phase-angle shift are formed in this case by an appropriate signal input of the measured value registration device which is connected to the separate device and receives the phase-angle shift that has been determined as an input signal. Since the phase-angle shift of the currents when under load corresponds, as explained above, to the phase shift of the voltages when not under load, the measurement of the phase-angle shift can also be carried out by a corresponding voltage measurement when not under load. The means for registering the phase-angle shift are then correspondingly configured as an alternative or in addition to the voltage measurement.

All of the explanations concerning the method according to the invention made above and below also apply to the device according to the invention, and vice versa in a similar manner; in particular, the device according to the invention is configured to carry out the method according to the invention in any arbitrary form of embodiment or a combination of arbitrary forms of embodiment. Reference is made to the advantages described with respect to the method according to the invention also in terms of the advantages of the device according to the invention.

The invention is explained below in more detail with reference to an exemplary embodiment. The specific design of the exemplary embodiment is not to be understood as restrictive in any way for the general design of the method according to the invention and the device according to the invention; on the contrary, individual design features of the exemplary embodiment can be combined freely with one another in an arbitrary manner and with the features described above.

For reasons of a simplified illustration, a transformer with two sides is assumed in the context of the exemplary embodiment. To apply the invention to transformers with more than two sides, the method described however only has to be carried out for all the other sides (apart from the reference side) in a corresponding manner.

BRIEF DESCRIPTION OF THE DRAWING

The FIGURE is a schematic illustration of a section of a two-sided, three-phase electrical energy supply system.

DESCRIPTION OF THE INVENTION

For this purpose the FIGURE schematically shows a section of a two-sided, three-phase electrical energy supply system with a transformer 10 that is monitored for the occurrence of internal faults (e.g. short-circuits, ground shorts, winding faults) by means of a differential protection device 11. Measured current values $I_A$, $I_B$, $I_C$ are registered for this purpose on a high-voltage side 10a ("reference side") of the transformer 10 by means of current measuring devices (e.g. inductive transducers or so-called non-conventional transducers), and are passed to an input of a measured value registration device 12 of the differential protection device 11. In a corresponding manner, measured current values $I_a$, $I_b$, $I_c$ are registered on the low-voltage side 10b ("other side") of the transformer 10 by means of current measuring devices, and are passed to a further input of the measured value registration device 12 of the differential protection device 11. The measured current values $I_A$, $I_B$, $I_C$, $I_a$, $I_b$, $I_c$ can here be transferred in analog or digital form to the measured value registration device 12. If the measured current values $I_A$, $I_B$, $I_C$, $I_a$, $I_b$, $I_c$ are present as analog measured values at the measured value registration device 12, they are filtered and subjected to an A/D conversion there, if appropriate. Otherwise filtering and A/D conversion already takes place outside the measured value registration device 12, for example by means of a so-called remote terminal unit or a merging unit; the digitized measured values are then transferred to the differential protection device 11 via a process bus.

The measured value registration device 12 is connected on its output side to an evaluation device 13 of the differential protection device 11, which can, for example, consist of an appropriately configured hardware computing component (ASIC, FPGA), a central microprocessor assembly, a digital signal processor or a combination of said devices. The evaluation device 13 is configured through software-determined and/or hardware-determined programming, to use the measured current values from both sides of the transformer 10 to carry out a differential protection method in order to be able to detect any internal faults and switch off.

Because in the transformation of current and voltage by the transformer 10, changes of amplitude and phase angle of the current output on the low-voltage side (and the voltage output on the low-voltage side) take place in comparison with the magnitudes present at the high-voltage side, it is first necessary in order to carry out the differential protection method, for the amplitude and the phase angle of the measured current values $I_a$, $I_b$, $I_c$ on the low-voltage side 10b of the transformer 10 to be adjusted.

For the amplitude-related adjustment, the measured current values Ia, Ib, Ic are adjusted using the transformer ratio n. This gives the ratio of the number of respective windings on the higher-voltage winding and the lower-voltage winding, and determines the amplitude-related change of the current during the transformation process. This adjustment is sufficiently well known, and will therefore not be described in further detail at this point. Following the amplitude adjustment, amplitude-adjusted measured current values I'$_a$, I'$_b$, I'$_c$ are present at the output side.

An adjustment of the phase angle between the upper-voltage side and the lower-voltage side is then carried out. The change in the phase angle results primarily from the constructively predetermined vector group and on the position of any tap switch or phase shifter. For this purpose the amplitude-adjusted measured current values I'$_a$, I'$_b$, I'$_c$ are converted by means of the adjustment equation shown below into amplitude-adjusted and phase-angle-adjusted measured current values I''$_a$, I''$_b$, I''$_c$:

$$\begin{pmatrix} I''_a \\ I''_b \\ I''_c \end{pmatrix} = \begin{pmatrix} k(\alpha) & k(\alpha - 120°) & k(\alpha + 120°) \\ k(\alpha + 120°) & k(\alpha) & k(\alpha - 120°) \\ k(\alpha - 120°) & k(\alpha + 120°) & k(\alpha) \end{pmatrix} \cdot \begin{pmatrix} I'_a \\ I'_b \\ I'_c \end{pmatrix}.$$

A phase-angle-dependent matrix component $k(\alpha)$, which is defined as follows, is used in this equation:

$$k(\alpha) = \frac{2}{3} \cdot \cos(\alpha) + \frac{1}{3} \cdot \sqrt{2} \cdot \cos\left(3 \cdot \alpha + \frac{1}{4} \cdot \pi\right).$$

If, as a result of corresponding neutral point treatment, a neutral system current component occurs on one side of the transformer 10, this can be compensated for together with the phase-angle adjustment, using an extended adjustment equation as illustrated below:

$$\begin{pmatrix} I''_a \\ I''_b \\ I''_c \end{pmatrix} = \begin{pmatrix} k(\alpha) & k(\alpha - 120°) & k(\alpha + 120°) \\ k(\alpha + 120°) & k(\alpha) & k(\alpha - 120°) \\ k(\alpha - 120°) & k(\alpha + 120°) & k(\alpha) \end{pmatrix} \cdot \begin{pmatrix} I'_a \\ I'_b \\ I'_c \end{pmatrix} + f(\alpha) \cdot \begin{pmatrix} I'_e \\ I'_e \\ I'_e \end{pmatrix},$$

$I'_e$ stands here for the neutral-point current, the amplitude of which may have been adjusted by means of the transformer ratio n, while $f(\alpha)$ represents the phase-angle-dependent neutral current component factor:

$$f(\alpha) = \frac{1}{3} \cdot \sqrt{2} \cdot \cos\left(3 \cdot \alpha + \frac{1}{4} \cdot \pi\right).$$

The neutral-point current $I_e$ can here, as described above, be determined computationally from the amplitude-adjusted measured current values. Alternatively, the neutral-point current $I_e$ can be determined through measurement, if an appropriate measuring device is present in the current path between the neutral point and ground, and transmitted to the differential protection device 11 (not shown in the FIGURE).

The amplitude-adjusted and phase-angle-adjusted measured current values $I''_a$, $I''_b$, $I''_c$ of the low-voltage side can now be employed, together with the measured current values $I_A$, $I_B$, $I_C$ registered on the higher-voltage side, for the differential protection comparison. In the simplest case, the difference between the magnitudes of measured current values in each case belonging to one phase are formed, forming a difference value, and compared with a threshold value. If the difference value exceeds the threshold value, an internal fault is detected, and a trip signal, TRIP, is output for a power switch (not illustrated in the FIGURE), in order to avoid further damage to the transformer.

In order to adjust the differential protection method dynamically to the size of the current flowing, it is also possible to form a stabilization current value from the measured current values $I_A$, $I_B$, $I_C$ and $I''_a$, $I''_b$, $I''_c$, (e.g. through phased addition of the magnitudes of the respective measured current values) and to check the position of the pair of measured values for the difference value and the stabilization current value in a tripping diagram. If the measured value pair of at least one phase of the transformer is located within a trip region, the trip signal TRIP, explained above, is generated.

The method has been explained above by way of example with reference to an adjustment of the measured current values of the low-voltage side. Varying from this, it is of course also possible for the measured current values of the higher-voltage side to be adjusted and compared in a differential protection comparison with the registered measured current values from the low-voltage side. Corresponding considerations apply to further sides of a transformer with more than two sides, meaning that in principle it is possible to specify any desired side of the transformer as a reference side.

It is possible for the phase angle $\alpha$ when the transformer is not under load to have a fixed specification and to be set, for example, as a parameter in the differential protection device 11. It can also, however, be determined phase-by-phase dynamically from the measured current values of both sides of the transformer with the measured value registration device 12, the evaluation device 13 or a corresponding separate measuring device 14, and made available to the differential protection device 11. This can be done continuously, at regular intervals, or event-driven. Alternatively, a setting S of a tap switch of the transformer 10 can also be registered, and conveyed to the differential protection device 11 which—making use of, for example, an appropriate table or of a suitable mathematical equation—determines the phase angle $\alpha$ depending on the respective position of the tap switch.

A universal adjustment of the measured current values in respect of the phase angle can be performed with the procedure described for arbitrary types of transformers. The method is in particular suitable for transformers with a phase shift that is other than 30° steps, or for transformers with the tap switches ("cross-regulators") that influence the phase-angle shift. The method can, however, also be used on transformers with a rigid construction and a conventional phase shift in 30° steps.

The invention claimed is:

1. A differential protection method for monitoring a three-phase transformer for internal faults, the method comprising:

registering measured current values defining a current curve within a respective phase for each phase on all sides of the transformer;

carrying out a phase-related difference-value formation using the registered measured current values from a reference side of the transformer and amplitude-adjusted and phase-angle-adjusted measured current values from all other sides of the transformer while forming respective difference values;

detecting an internal fault in the transformer if at least one of the difference values exceeds a prespecified threshold value;

in order to form the amplitude-adjusted and phase-angle-adjusted measured current values, initially subjecting the measured current values for all phases registered on all other sides of the transformer to an amplitude adjustment with a formation of amplitude-adjusted measured current values using a transformer ratio; and thereafter subjecting the amplitude-adjusted measured current values to a phase-angle adjustment with a formation of amplitude-adjusted and phase-angle-adjusted measured current values, to compensate for a phase shift caused by the transformer;

using the following equation for the phase-angle adjustment of the measured current values:

$$\begin{pmatrix} I''_a \\ I''_b \\ I''_c \end{pmatrix} = \begin{pmatrix} k(\alpha) & k(\alpha - 120°) & k(\alpha + 120°) \\ k(\alpha + 120°) & k(\alpha) & k(\alpha - 120°) \\ k(\alpha - 120°) & k(\alpha + 120°) & k(\alpha) \end{pmatrix} \cdot \begin{pmatrix} I'_a \\ I'_b \\ I'_c \end{pmatrix},$$

with a matrix coefficient $$k(\alpha) = \frac{2}{3} \cdot \cos(\alpha) + \frac{1}{3} \cdot \sqrt{2} \cdot \cos\left(3 \cdot \alpha + \frac{1}{4} \cdot \pi\right).$$

where
- I″$_a$=the amplitude-adjusted and phase-angle-adjusted measured current value of a respective other side of the transformer for phase a;
- I″$_b$=the amplitude-adjusted and phase-angle-adjusted measured current value of the respective other side of the transformer for phase b;
- I″$_c$=the amplitude-adjusted and phase-angle-adjusted measured current value of the respective other side of the transformer for phase c;
- I′$_a$=the amplitude-adjusted measured current value of the respective other side of the transformer for phase a;
- I′$_b$=the amplitude-adjusted measured current value of the respective other side of the transformer for phase b;
- I′$_c$=the amplitude-adjusted measured current value of the respective other side of the transformer for phase c; and
- α=a shift in the phase angle caused by the transformer under load between the phase-related currents on the respective other side of the transformer relative to the phase-related currents on the reference side of the transformer.

2. The differential protection method according to claim 1, wherein the phase-angle adjustment further comprises:
correcting a neutral current component of the amplitude-adjusted measured current values of the respective other side of the transformer and thereby performing the phase-angle adjustment according to the following extended equation:

$$\begin{pmatrix} I''_a \\ I''_b \\ I''_c \end{pmatrix} = \begin{pmatrix} k(\alpha) & k(\alpha-120°) & k(\alpha+120°) \\ k(\alpha+120°) & k(\alpha) & k(\alpha-120°) \\ k(\alpha-120°) & k(\alpha+120°) & k(\alpha) \end{pmatrix} \cdot \begin{pmatrix} I'_a \\ I'_b \\ I'_c \end{pmatrix} + f(\alpha) \cdot \begin{pmatrix} I'_e \\ I'_e \\ I'_e \end{pmatrix},$$

with the neutral current component factor $$f(\alpha) = \frac{1}{3} \cdot \sqrt{2} \cdot \cos\left(3 \cdot \alpha + \frac{1}{4} \cdot \pi\right),$$

where I′$_e$ is an amplitude-adjusted neutral-point current.

3. The differential protection method according to claim 2, which comprises:
determining the neutral-point current by measurement; and
subjecting the neutral-point current to an amplitude adjustment making use of the transformer ratio, to forming the amplitude-adjusted neutral-point current.

4. The differential protection method according to claim 2, which comprises calculating the neutral-point current from the amplitude-adjusted measured current values of the respective other side of the transformer.

5. The differential protection method according to claim 1, which comprises pre-specifying the shift in the phase angle caused by the transformer when under load between the phase-related currents on the respective other side of the transformer relative the phase-related currents on the reference side of the transformer as a parameter.

6. The differential protection method according to claim 1, which comprises determining by measurement the shift in the phase angle caused by the transformer when under load between the phase-related currents on the respective other side of the transformer relative to the phase-related currents on the reference side of the transformer.

7. The differential protection method according to claim 1, which comprises deriving the shift in the phase angle caused by the transformer when under load between the phase-related currents on the respective other side of the transformer relative to the phase-related currents on the reference side of the transformer from a position of a tap switch of the transformer.

8. The differential protection method according to claim 7, which comprises determining the phase-angle shift using a table giving a respective position of the tap switch together with the phase-angle shift caused thereby.

9. The differential protection method according to claim 7, which comprises determining the phase-angle shift using a mathematical equation describing the respective phase-angle shift depending on a respective position of the tap switch.

10. A differential protection device for monitoring a three-phase transformer for internal faults, the device comprising:
a measured value registration device configured to register measured current values defining a current curve within a respective phase for each phase on all sides of the transformer; and
an evaluation device configured to carry out a phase-related difference-value formation using the registered measured current values from a reference side of the transformer and amplitude-adjusted and phase angle-adjusted measured current values from all other sides of the transformer while forming respective difference values, and configured to detect an internal fault in the transformer if at least one of the difference values exceeds a prespecified threshold value;
wherein, in order to form the amplitude-adjusted and phase-angle-adjusted measured current values, said evaluation device is configured to initially subject the measured current values for all phases registered on all other sides of the transformer to an amplitude adjustment to form amplitude-adjusted measured current values using a transformer ratio, and then to subject the amplitude-adjusted measured current values to a phase-angle adjustment to form amplitude-adjusted and phase-angle-adjusted measured current values, which compensates for a phase shift caused by the transformer;
wherein:
said evaluation device is configured to use the following equation for phase-angle adjustment of the measured current values:

$$\begin{pmatrix} I''_a \\ I''_b \\ I''_c \end{pmatrix} = \begin{pmatrix} k(\alpha) & k(\alpha-120°) & k(\alpha+120°) \\ k(\alpha+120°) & k(\alpha) & k(\alpha-120°) \\ k(\alpha-120°) & k(\alpha+120°) & k(\alpha) \end{pmatrix} \cdot \begin{pmatrix} I'_a \\ I'_b \\ I'_c \end{pmatrix},$$

with the matrix coefficient $$k(\alpha) = \frac{2}{3} \cdot \cos(\alpha) + \frac{1}{3} \cdot \sqrt{2} \cdot \cos\left(3 \cdot \alpha + \frac{1}{4} \cdot \pi\right),$$

where
- I″$_a$=the amplitude-adjusted and phase-angle-adjusted measured current value of a respective other side of the transformer for phase a;

I″$_b$=the amplitude-adjusted and phase-angle-adjusted measured current value of the respective other side of the transformer for phase b;

I″$_c$=the amplitude-adjusted and phase-angle-adjusted measured current value of the respective other side of the transformer for phase c;

I'$_a$=the amplitude-adjusted measured current value of the respective other side of the transformer for phase a;

I'$_b$=the amplitude-adjusted measured current value of the respective other side of the transformer for phase b;

I'$_c$=the amplitude-adjusted measured current value of the respective other side of the transformer for phase c; and α=a shift in the phase angle caused by the transformer under load between the phase-related currents on the respective other side of the transformer relative to the phase-related currents on the reference side of the transformer.

11. The differential protection device according to claim 10, wherein said evaluation device is configured to carry out the phase-angle adjustment by also correcting a neutral current component of the amplitude-adjusted measured current values of the respective other side of the transformer and wherein the phase-angle adjustment is performed according to the following extended equation:

$$\begin{pmatrix} I''_a \\ I''_b \\ I''_c \end{pmatrix} = \begin{pmatrix} k(\alpha) & k(\alpha - 120°) & k(\alpha + 120°) \\ k(\alpha + 120°) & k(\alpha) & k(\alpha - 120°) \\ k(\alpha - 120°) & k(\alpha + 120°) & k(\alpha) \end{pmatrix} \cdot \begin{pmatrix} I'_a \\ I'_b \\ I'_c \end{pmatrix} + f(\alpha) \cdot \begin{pmatrix} I'_e \\ I'_e \\ I'_e \end{pmatrix},$$

with the neutral current component factor $$f(\alpha) = \frac{1}{3} \cdot \sqrt{2} \cdot \cos\left(3 \cdot \alpha + \frac{1}{4} \cdot \pi\right),$$

where I'$_e$ is an amplitude-adjusted neutral-point current.

12. The differential protection device according to claim 10, wherein said measured value registration device of the differential protection device comprises a device for registering a position of a tap switch of the transformer.

13. The differential protection device according to claim 10, wherein said measured value registration device or said evaluation device of the differential protection device is configured to register a shift in the phase angle caused by the transformer when under load between the phase-related currents on the respective other side of the transformer in respect of the phase-related currents on the reference side of the transformer.

* * * * *